(12) United States Patent
Wei et al.

(10) Patent No.: US 12,739,031 B2
(45) Date of Patent: Sep. 15, 2026

(54) RADIO FREQUENCY LINK TRANSMISSION OF UPLINK COMMUNICATIONS ASSOCIATED WITH VISIBLE LIGHT COMMUNICATIONS

(71) Applicant: QUALCOMM Incorporated, San Diego, CA (US)

(72) Inventors: Chao Wei, Beijing (CN); Kangqi Liu, San Diego, CA (US); Qiaoyu Li, Beijing (CN); Jing Dai, Beijing (CN); Hao Xu, Beijing (CN)

(73) Assignee: QUALCOMM Incorproated, San Diego, CA (US)

(*) Notice: Subject to any disclaimer, the term of this patent is extended or adjusted under 35 U.S.C. 154(b) by 253 days.

(21) Appl. No.: 18/696,099

(22) PCT Filed: Dec. 3, 2021

(86) PCT No.: PCT/CN2021/135290

§ 371 (c)(1),
(2) Date: Mar. 27, 2024

(87) PCT Pub. No.: WO2023/097642

PCT Pub. Date: Jun. 8, 2023

(65) Prior Publication Data

US 2024/0396632 A1 Nov. 28, 2024

(51) Int. Cl.

*H04B 10/116* (2013.01)
*H04L 5/00* (2006.01)
*H04W 74/0833* (2024.01)

(52) U.S. Cl.

CPC .......... *H04B 10/116* (2013.01); *H04L 5/0048* (2013.01); *H04L 5/0055* (2013.01); *H04W 74/0833* (2013.01)

(58) Field of Classification Search

CPC .... H04B 10/116; H04L 5/0048; H04L 5/0055

(Continued)

(56) References Cited

U.S. PATENT DOCUMENTS

2014/0153923 A1* 6/2014 Casaccia ............ H04B 10/1149 398/58
2014/0226977 A1* 8/2014 Jovicic ..................... H04B 3/46 398/115

(Continued)

FOREIGN PATENT DOCUMENTS

CA 3204806 A1 * 4/2023 ........... H04B 10/116
EP 3635883 B1 * 2/2023 ......... H04B 10/1149

OTHER PUBLICATIONS

Shi et al; Experimental 5G New Radio integration with VLC, 2018, IEEE, pp. 1-4. (Year: 2018).*

(Continued)

*Primary Examiner* — Amritbir K Sandhu
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station and via a radio frequency (RF) link, an indication of resources that support transmission, via the RF link, of an uplink communication associated with a downlink communication received via a visible light communications (VLC) link. The UE may transmit, via the resources, the uplink communication associated with the downlink communication received via the VLC link. Numerous other aspects are described.

30 Claims, 13 Drawing Sheets

(58) Field of Classification Search
USPC .......................................................... 398/172
See application file for complete search history.

(56) References Cited

U.S. PATENT DOCUMENTS

| | | | | |
|---|---|---|---|---|
| 2020/0274656 | A1 | 8/2020 | Gordaychik | |
| 2022/0116188 | A1* | 4/2022 | Zhou | H04L 1/1896 |
| 2023/0299849 | A1* | 9/2023 | Zhang | H04L 12/10<br>398/115 |

OTHER PUBLICATIONS

International Search Report and Written Opinion—PCT/CN2021/135290—ISA/EPO—May 30, 2022.

Lina S., et al., "Experimental SG New Radio Integration with VLC", 2018 25th IEEE International Conference on Electronics, Circuits and Systems (ICECS), IEEE, Dec. 9, 2018 ( Dec. 9, 2018) , pp. 61-64, XP033503991, DOI: 10.1109/ICECS.2018.8617851 [Retrieved on Jan. 17, 2019] Figures 1-6 Sections I-IV.

* cited by examiner

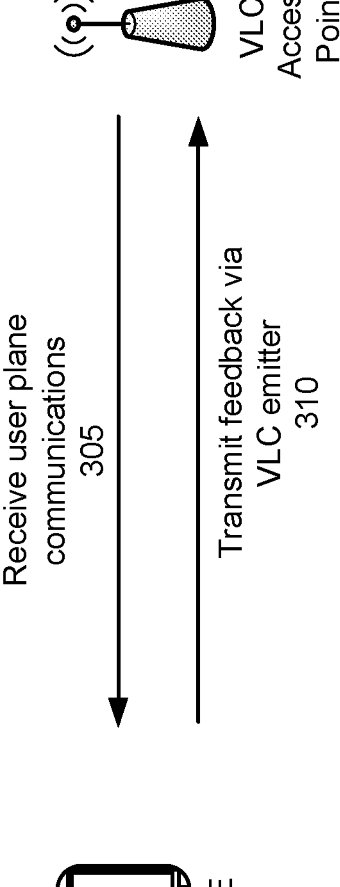
FIG. 3

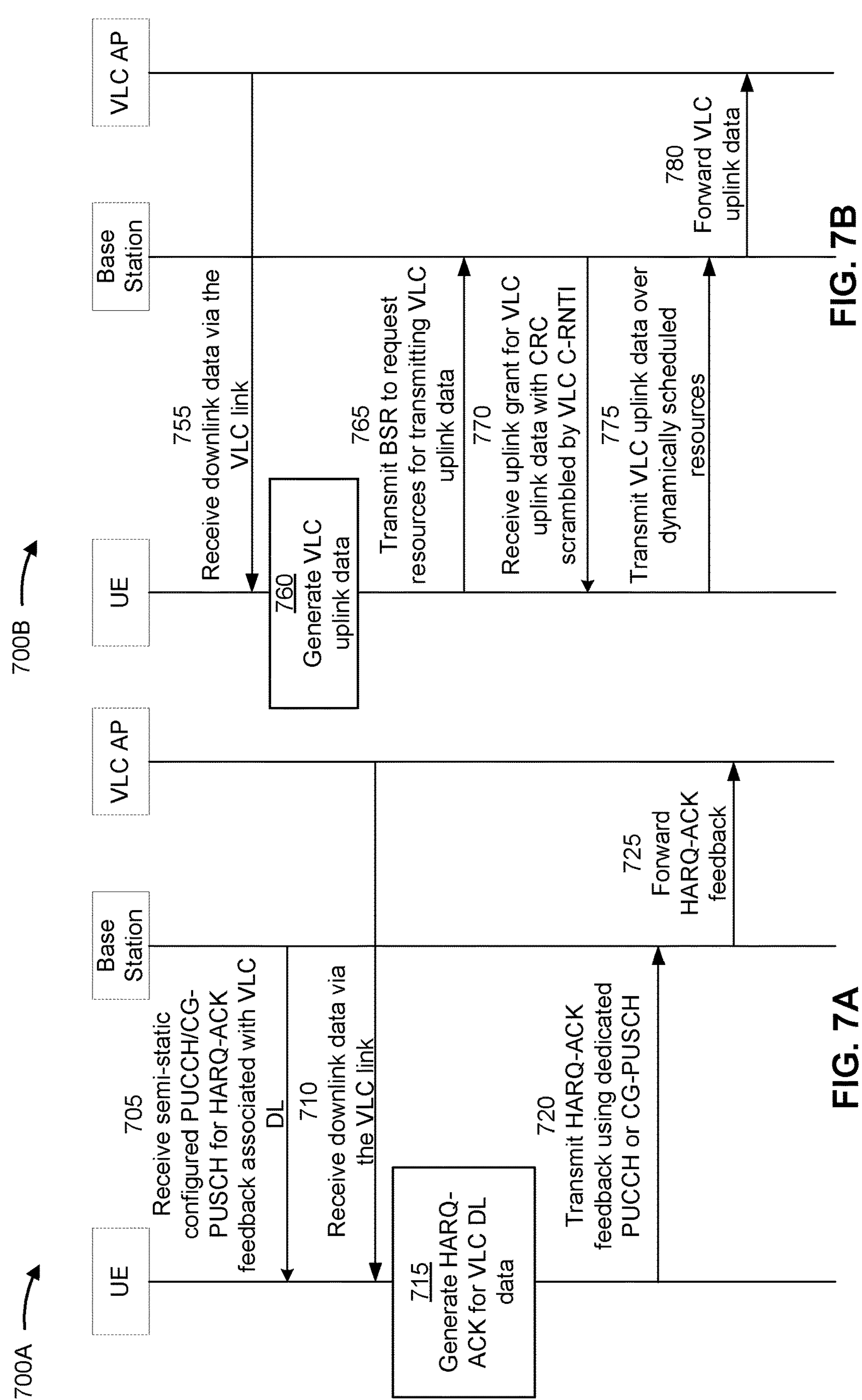

700A
UE
Base Station
VLC AP
705
Receive semi-static configured PUCCH/CG-PUSCH for HARQ-ACK feedback associated with VLC DL
710
Receive downlink data via the VLC link
715
Generate HARQ-ACK for VLC DL data
720
Transmit HARQ-ACK feedback using dedicated PUCCH or CG-PUSCH
725
Forward HARQ-ACK feedback
FIG. 7A
700B
UE
Base Station
VLC AP
755
Receive downlink data via the VLC link
760
Generate VLC uplink data
765
Transmit BSR to request resources for transmitting VLC uplink data
770
Receive uplink grant for VLC uplink data with CRC scrambled by VLC C-RNTI
775
Transmit VLC uplink data over dynamically scheduled resources
780
Forward VLC uplink data
FIG. 7B

RADIO FREQUENCY LINK TRANSMISSION OF UPLINK COMMUNICATIONS ASSOCIATED WITH VISIBLE LIGHT COMMUNICATIONS

CROSS-REFERENCE TO RELATED APPLICATION

This Patent Application is a 371 national stage of PCT Application No. PCT/CN2021/135290, filed on Dec. 3, 2021, entitled "RADIO FREQUENCY LINK TRANSMISSION OF UPLINK COMMUNICATIONS ASSOCIATED WITH VISIBLE LIGHT COMMUNICATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for radio frequency link transmission of uplink communications associated with visible light communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3 and 4 are diagrams illustrating examples of transmission of uplink communications associated with visual light communications (VLC), in accordance with the present disclosure.

FIGS. 5-9 are diagrams illustrating examples associated with radio frequency link transmission of uplink communications associated with visible light communications, in accordance with the present disclosure.

SUMMARY

Figure 1:
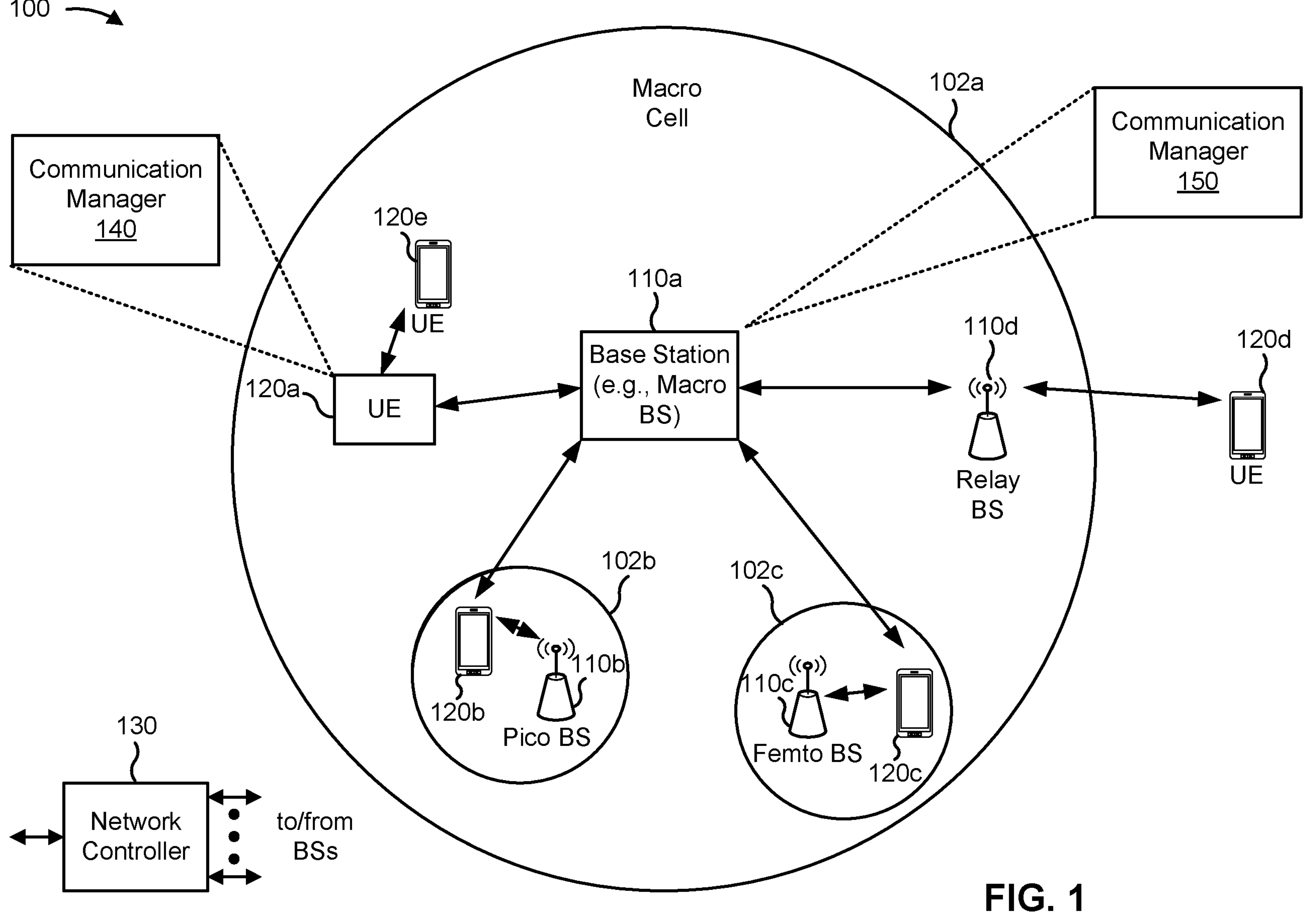
FIG. 1 is a diagram illustrating an example of a wireless network, in accordance with the present disclosure.

Some aspects described herein relate to a method of wireless communication performed by a user equipment (UE). The method may include receiving, from a base station and via a radio frequency (RF) link, an indication of resources that support transmission, via the RF link, of an uplink communication associated with a downlink communication received via a visible light communications (VLC) link. The method may include transmitting, via the resources, the uplink communication associated with the downlink communication received via the VLC link.

Some aspects described herein relate to a method of wireless communication performed by a base station. The method may include transmitting, to a UE and via an RF link, an indication of resources that support transmission, via the RF link, of an uplink communication associated with a downlink communication received by the UE via a VLC link. The method may include receiving, via the resources, the uplink communication associated with the downlink communication received via the VLC link.

Some aspects described herein relate to a UE for wireless communication. The user equipment may include a memory and one or more processors coupled to the memory. The one or more processors may be configured to receive, from a base station and via an RF link, an indication of resources that support transmission, via the RF link, of an uplink communication associated with a downlink communication received via a VLC link. The one or more processors may be configured to transmit, via the resources, the uplink communication associated with the downlink communication received via the VLC link.

Some aspects described herein relate to a base station for wireless communication. The base station may include a memory and one or more processors coupled to the memory. The one or more processors may be configured to transmit, to a UE and via an RF link, an indication of resources that support transmission, via the RF link, of an uplink communication associated with a downlink communication received by the UE via a VLC link. The one or more processors may be configured to receive, via the resources, the uplink communication associated with the downlink communication received via the VLC link.

Some aspects described herein relate to a non-transitory computer-readable medium that stores a set of instructions for wireless communication by a UE. The set of instructions, when executed by one or more processors of the UE, may cause the UE to receive, from a base station and via an RF link, an indication of resources that support transmission, via the RF link, of an uplink communication associated with a downlink communication received via a VLC link. The set of instructions, when executed by one or more processors of the UE, may cause the UE to transmit, via the resources, the uplink communication associated with the downlink communication received via the VLC link.

Some aspects described herein relate to a non-transitory computer-readable medium that stores a set of instructions for wireless communication by a base station. The set of instructions, when executed by one or more processors of the base station, may cause the base station to transmit, to a UE and via an RF link, an indication of resources that support transmission, via the RF link, of an uplink communication associated with a downlink communication received by the UE via a VLC link. The set of instructions, when executed by one or more processors of the base station, may cause the base station to receive, via the resources, the uplink communication associated with the downlink communication received via the VLC link.

Some aspects described herein relate to an apparatus for wireless communication. The apparatus may include means for receiving, from a base station and via an RF link, an indication of resources that support transmission, via the RF link, of an uplink communication associated with a downlink communication received via a VLC link. The apparatus may include means for transmitting, via the resources, the uplink communication associated with the downlink communication received via the VLC link.

Some aspects described herein relate to an apparatus for wireless communication. The apparatus may include means for transmitting, to a UE and via an RF link, an indication of resources that support transmission, via the RF link, of an uplink communication associated with a downlink communication received by the UE via a VLC link. The apparatus may include means for receiving, via the resources, the uplink communication associated with the downlink communication received via the VLC link.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, RF chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented separately of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a UE 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a geographic area. In the Third Generation Partnership Project (3GPP), the term "cell" can refer to a coverage area of a base station 110 and/or a base station subsystem serving this coverage area, depending on the context in which the term is used.

Abase station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term “sub-6 GHz” or the like, if used herein, may broadly represent frequencies that may be less than 6 GHz, may be within FR1, or may include mid-band frequencies. Further, unless specifically stated otherwise, it should be understood that the term “millimeter wave” or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station and via an RF link, an indication of resources that support transmission, via the RF link, of an uplink communication associated with a downlink communication received via a VLC link; and transmit, via the resources, the uplink communication associated with the downlink communication received via the VLC link. Additionally, or alternatively, the communication manager 140 may perform one or more other operations described herein.

In some aspects, the base station 110 may include a communication manager 150. As described in more detail elsewhere herein, the communication manager 150 may transmit, to a UE and via an RF link, an indication of resources that support transmission, via the RF link, of an uplink communication associated with a downlink communication received by the UE via a VLC link; and receive, via the resources, the uplink communication associated with the downlink communication received via the VLC link. Additionally, or alternatively, the communication manager 150 may perform one or more other operations described herein.

As indicated above, FIG. 1 is provided as an example. Other examples may differ from what is described with regard to FIG. 1.

Figure 2:
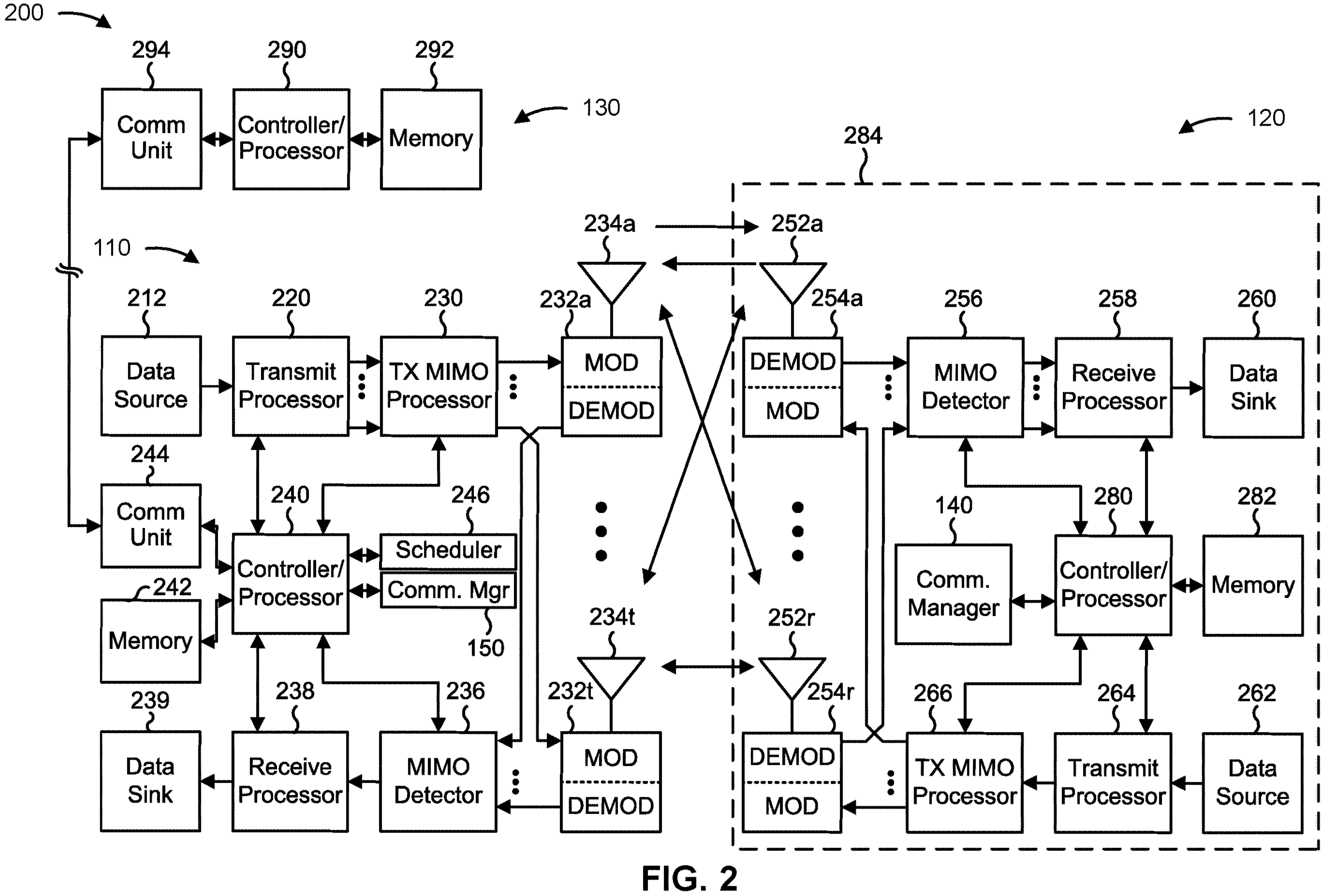
FIG. 2 is a diagram illustrating an example of a base station in communication with a user equipment (UE) in a wireless network, in accordance with the present disclosure.

FIG. 2 is a diagram illustrating an example 200 of abase station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s)254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the base station 110, the controller/processor 280 of the UE 120, and/or any other component(s) of FIG. 2 may perform one or more techniques associated with radio frequency link transmission of uplink communications associated with visible light communications, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE includes means for receiving, from a base station and via an RF link, an indication of resources that support transmission, via the RF link, of an uplink communication associated with a downlink communication received via a VLC link; and/or means for transmitting, via the resources, the uplink communication associated with the downlink communication received via the VLC link. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE and via an RF link, an indication of resources that support transmission, via the RF link, of an uplink communication associated with a downlink communication received by the UE via a VLC link; and/or means for receiving, via the resources, the uplink communication associated with the downlink communication received via the VLC link. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIG. 3 is a diagram illustrating an example 300 of transmission of uplink communications associated with VLC, in accordance with the present disclosure. As shown in FIG. 3, a UE may communicate with a VLC access point (AP) using transmission of visual light signaling.

As shown by reference number 305, the UE may receive user plane communications (e.g., downlink signaling) from the VLC AP. As shown by reference number 310 the UE may transmit feedback via a VLC emitter of the UE.

VLC may be used as an alternative radio access technology to RF-based communications. For example, VLC may be used for indoor communications. In VLC technology, data is transmitted using a VLC emitter, such as a Light Emitting Diode (LED) light bulb that varies in intensity faster than a human eye can follow.

If the VLC AP uses the VLC for broadcast transmissions, no uplink link may be needed. When the VLC AP uses the VLC for unicast transmissions, a VLC uplink may be used to carry layer 1 (L1) feedback (e.g., channel state information (CSI) and/or hybrid automatic repeat request (HARQ) acknowledgment (ACK) (HARQ-ACK)) to aid subsequent downlink transmissions via the VLC and/or to transmit upper layer control information (e.g., UE identification, capability, and/or application layer ACK) to the VLC AP.

A receiving device for VLC may use a photo-detector to detect light emitted by the VLC emitter and convert the detected light into an electrical signal that includes a message and/or noise. In some aspects, the photo-detector may include a photo-diode (PD) and/or an image sensor (IS). When the receiving device is a UE, the UE may use the image sensor for receiving the VLC signals to avoid additional cost associated with using the PD. For some UEs, the UE may be configured to receive the VLC signals in the downlink (e.g., via an embedded camera or a PD); however, transmission of a VLC signal in the uplink may not feasible based at least in part on high power consumption for VLC transmission and power storage constraints of the UE.

As indicated above, FIG. 3 is provided as an example. Other examples may differ from what is described with regard to FIG. 3.

Figure 4:
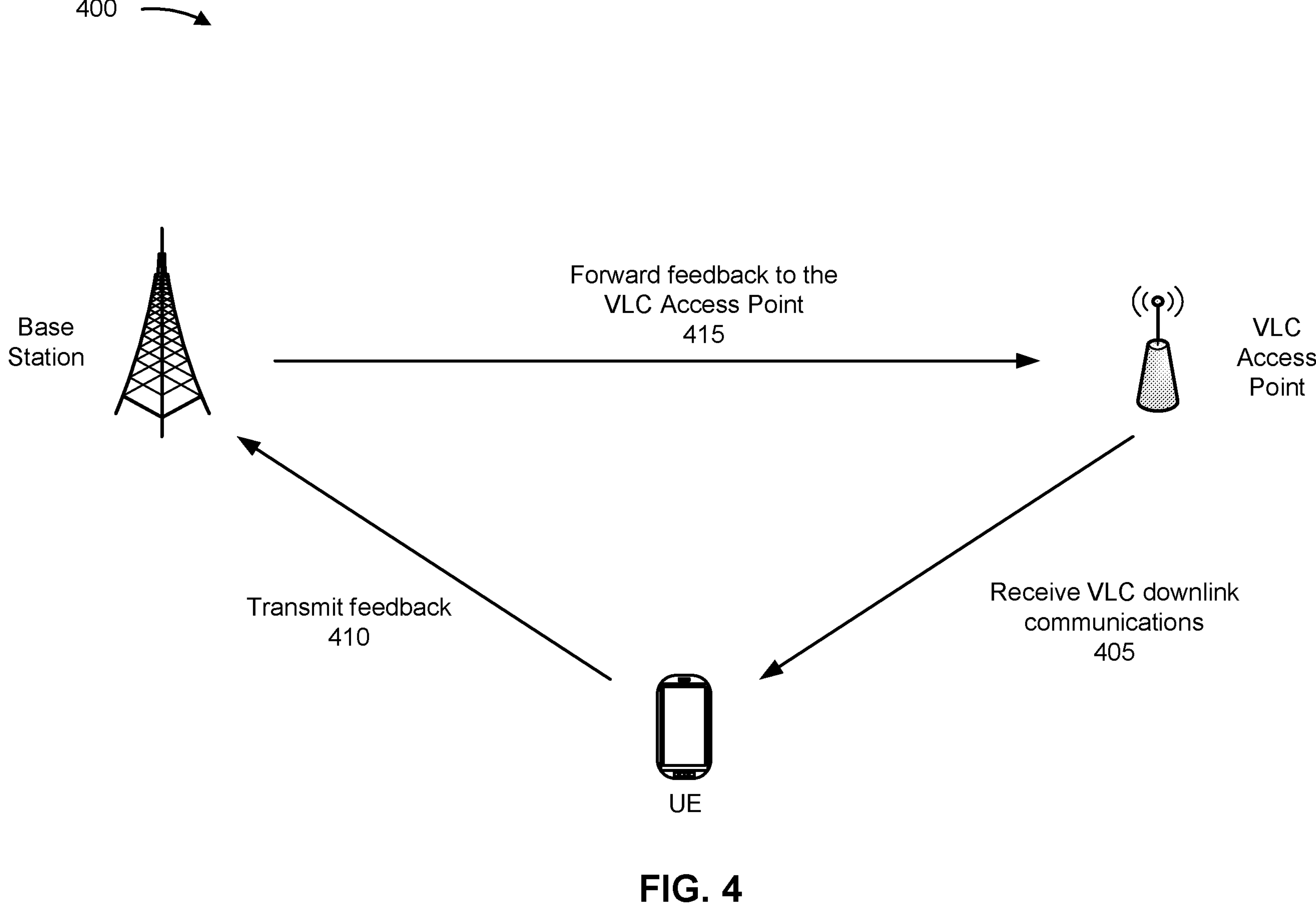

FIG. 4 is a diagram illustrating an example 400 of transmission of uplink communications associated with VLC, in accordance with the present disclosure. As shown in FIG. 4, a UE may communicate with a VLC AP and a base station. The base station and the VLC may communicate via backhaul connection (e.g., with or without a connection via a core network).

As shown by reference number 405, the UE may receive VLC downlink communications from the VLC AP. For example, the UE may receive downlink data from the VLC AP using the PD.

As shown by reference number 410, the UE may transmit feedback associated with the VLC communications via an RF transmitter. For example, the UE may transmit HARQ-ACK associated with the VLC downlink communications via an RF transmitter to the base station.

As shown by reference number 415, the base station may forward the feedback to the VLC AP. As shown by reference number 425, the VLC AP may receive the feedback from the base station via the backhaul. In this way, the VLC AP may receive feedback (e.g., L1 feedback) associated with the VLC downlink communications.

As indicated above, FIG. 4 is provided as an example. Other examples may differ from what is described with regard to FIG. 4.

In some aspects described herein, a UE may use a hybrid RF-VLC architecture (e.g., for indoor communications) where an RF link is configured for uplink communication associated with a downlink communication received via a VLC link. The RF link and the VLC link may be provided by non-co-located nodes (e.g., an outdoor gNB and an indoor VLC AP).

In some aspects, the RF link includes both downlink and uplink communication links where the downlink link provides scheduling control information for uplink transmissions on the RF link (e.g., the uplink transmissions on the RF link are scheduled by the base station and not by the VLC AP to account for different numerologies and timing synchronization between two technologies). The base station may be configured to relay and/or forward an uplink communication to the VLC AP based at least in part on one or more parameters of the uplink communication. For example, the base station may relay and/or forward the uplink communication to the VLC AP based at least in part on an indication from the UE that the uplink communication is associated with the VLC link, a resource used by the UE to transmit the uplink communication, and/or a DMRS sequence associated with the uplink communication, among other examples.

In some aspects, the VLC AP may have direct connection to the Internet (e.g., outside of a core network associated with the base station) such that the VLC AP may provide a connection to the Internet for the UE that is outside of the core network of the base station. In some aspects, the UE may not establish a connection to the core network associated with the base station when using the hybrid RF-VLC architecture. In some aspects, the UE may also directly communicate with the base station using the same RF link that is used for uplink communication intended for the VLC AP.

In some aspects, the base station may dynamically schedule multiplexing of VLC uplink traffic and RF uplink traffic (to a single UE or different UEs) on a single uplink carrier. In some aspects, the base station may semi-statically configure physical uplink control channel (PUCCH) and/or physical uplink shared channel (PUSCH) time and/or frequency resources that are dedicated for VLC uplink traffic. For example, the base station may schedule periodic PUCCH resources for HARQ-ACK feedback associated with VLC downlink data reception. Additionally, or alternatively, the base station may semi-statically configure PUCCH and/or PUSCH time and/or frequency resources shared between VLC and RF uplink traffic. The UE may select resources for transmitting VLC or RF uplink communications. In some aspects, the UE may indicate a traffic type (e.g., VLC or RF traffic) in the uplink data and/or associated control information. For example, the UE may use an L1 or layer 2 (L2) indication of the traffic type.

In some aspects, the base station may dynamically schedule resources for transmitting VLC or RF uplink traffic based on UE request. For example, the base station may indicate whether a scheduled resource is for transmitting VLC or RF uplink traffic using a specific cell radio network temporary identifier (C-RNTI) associated with the VLC or with the RF link and/or using a field in a downlink control information (DCI) scheduling communication (e.g., a physical downlink control channel (PDCCH) communication).

The base station may be configured to route received VLC uplink data to an associated VLC AP. In some aspects, the base station may route the received VLC uplink data via a backhaul connection to the VLC AP. In some networks having multiple VLC APs connected to the base station, an identity of a target VLC AP may be indicated within the VLC uplink data, an associated uplink transmission, and/or in a semi-static indication of a VLC AP associated with the UE. For example, during connection setup for the VLC uplink transmissions, the UE may indicate the identity of the VLC AP for downlink communication. If only one VLC AP is indicated by the UE, the base station may maintain a mapping between the VLC C-RNTI and the VLC AP for the UE.

In some aspects, the base station may indicate whether the base station supports reception and routing of VLC uplink data to the VLC AP via an RF uplink carrier. The base station may list all VLC APs that the base station supports for VLC uplink data forwarding. If the base station indicates support for VLC uplink data forwarding, the base station and/or an associated cell may also configure separate physical random access channel (PRACH) resources for VLC uplink connection setup to support the UE acquiring a VLC C-RNTI via a random access channel (RACH) procedure and to register the VLC C-RNTI in the associated cell (e.g., an RF cell such as an NR cell).

In some aspects, the indication may include an upper layer identification, such as a logic channel or a radio bearer identification, among other examples. In some aspects, the indication may include a physical layer identification, such as VLC C-RNTI, a DMRS sequence and/or a resource index, among other examples. For a physical layer identification, the UE may transmit VLC uplink traffic or RF uplink traffic at each transmission occasion. For an upper layer identification, the UE may multiplex RF and VLC uplink traffic in a same PUSCH uplink transmission.

For a VLC-based uplink communication that includes uplink control information (UCI) (e.g., HARQ-ACK, CSI, and/or a scheduling request), the UE may use dedicated resources to differentiate between UCI for VLC downlink communications and UCI for RF downlink communications. For example, HARQ-ACK for VLC downlink communications may be transmitted via periodic configured resources instead of dynamically scheduled resources used for HARQ-ACK for RF DL based at least in part on asynchronized operation between the VLC link and the RF link numerologies.

The UE may transmit buffer status reports separately for VLC and RF to assist the base station in scheduling VLC uplink data transmissions and RF uplink data transmissions. The VLC buffer status report (BSR) may be reported together with normal RF data based at least in part on the UE being allocated with a PUSCH resource to transmit the RF uplink data. If the PUSCH resource does not include sufficient available resources to include the VLC BSR, the UE may use a separately configured physical scheduling request (scheduling request) resource or PRACH preamble, among other examples, for sending the VLC BSR (e.g., with the physical scheduling request resource being different from RF scheduling request resources).

In some aspects in which the UE is configured with a VLC C-RNTI, the UE may monitor for a PDCCH communication with a cyclic resource check (CRC) scrambled with the VLC C-RNTI based at least in part on the UE having sent a BSR or SR to request an allocation of uplink radio resources for the VLC uplink data transmission. In some aspects, the UE may not monitor for the PDCCH communication with the CRC scrambled with the VLC C-RNTI based at least in part on the UE not having sent the BSR or SR. For example, the PDCCH may have an associated CRC scrambled with VLC C-RNTI only for uplink assignment and not for downlink grant (e.g., based at least in part on the VLC downlink being scheduled via the VLC AP). If the UE does not support direct communications with the base station (e.g., based at least in part on not registering with the core network), the UE may be configured with a VLC C-RNTI and not an RF C-RNTI. If the UE does support direct communication with the base station, the UE may be configured with both a C-RNTI and a VLC C-RNTI, where the C-RNTI is used for direct communications with the base station without uplink data forwarding to the VLC AP.

Based at least in part on the base station supporting routing of VLC uplink communications to the VLC access point, the UE may conserve power resources that may otherwise be used to transmit VLC uplink communications via a VLC emitter. Additionally, or alternatively, based at least in part on the base station providing an indication of RF resources that support transmission of an uplink communication associated with a downlink communication received via a VLC link, the UE may transmit the uplink communication using numerology of an RF cell (e.g., an NR cell) provided by the base station and avoid communication errors that may have otherwise been caused by asynchronized numerology between the VLC link and the RF cell. Additionally, or alternatively, based at least in part on the UE indicating that the uplink communication is associated with the downlink communication received via the VLC link, the base station may route the uplink communication to the VLC AP without forwarding the uplink communication to an associated core network. In this way, the VLC AP may receive the uplink communication with reduced latency, the uplink communication may conserve resources of the core network, and/or the uplink communication may be used by the VLC AP to modify transmission parameters to reduce communication errors in subsequent VLC downlink communications.

Figure 5:
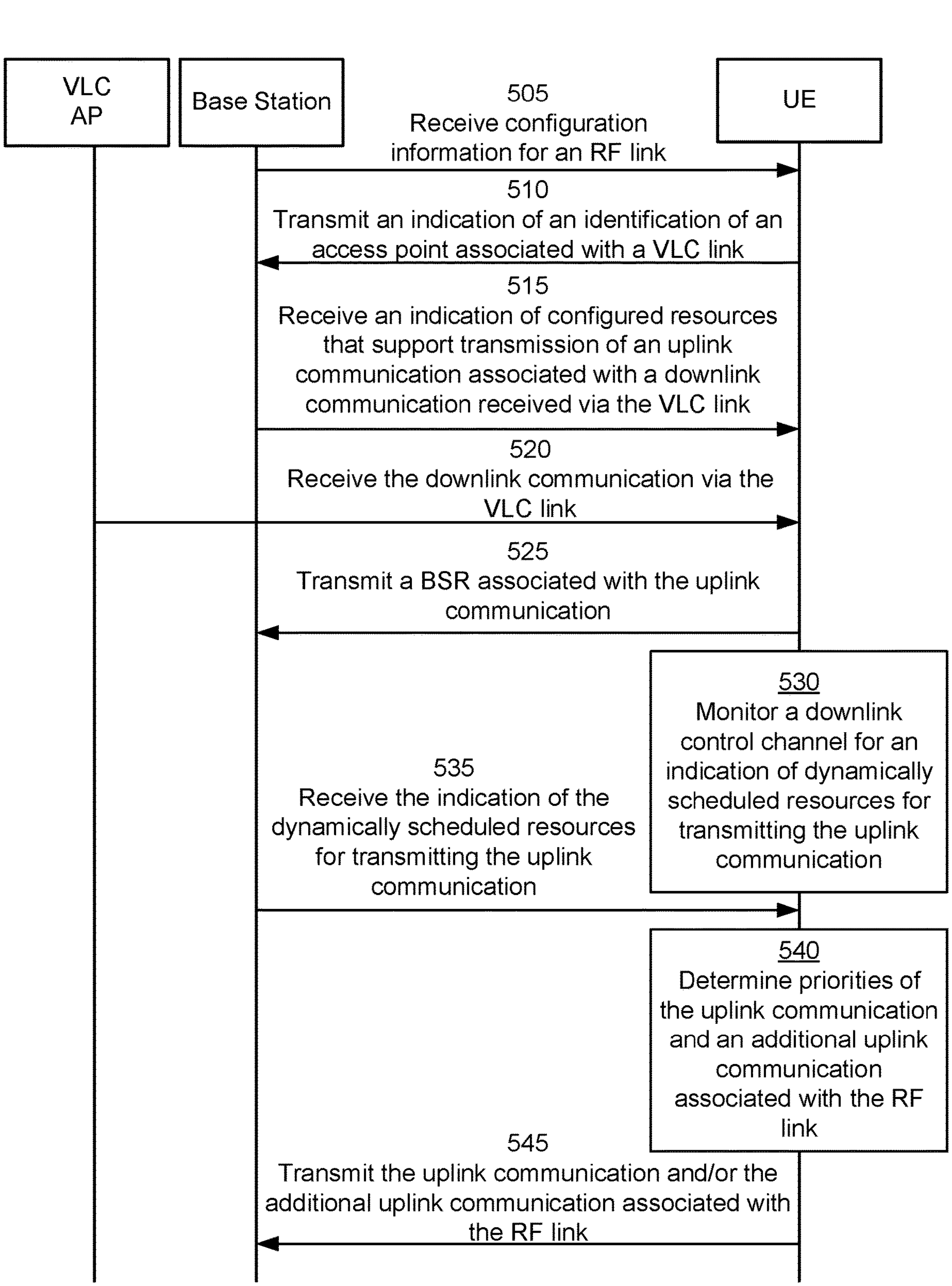

FIG. 5 is a diagram illustrating an example 500 associated with RF link transmission of uplink communications associated with VLC, in accordance with the present disclosure. As shown in FIG. 5, a base station (e.g., base station 110) and a VLC AP may communicate with a UE (e.g., UE 120). In some aspects, the base station and the UE may be part of a first wireless network (e.g., wireless network 100). In some aspects, the VLC AP and the UE may be part of a second wireless network (e.g., the same network as the first wireless network or a different wireless network. The UE and the base station may have established a wireless connection prior to operations shown in FIG. 5. In some aspects, the base station may provide network access (e.g., to an associated core network and/or to the Internet) to at least one of the UE or an additional UE.

As shown by reference number 505, the base station may transmit, and the UE may receive, configuration information for an RF link. In some aspects, the UE may receive the configuration information via one or more of a system information block (SIB), radio resource control (RRC) signaling, one or more MAC CEs, and/or DCI, among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the base station supports reception of the uplink communication for routing to an access point associated with the VLC link. In some aspects, the configuration information may indicate access channel resources to register the UE via the RF link. In some aspects, the configuration information may indicate a list of the VLC access points that the base station supports forwarding the uplink communication. In some aspects, the UE may be configured to read the list (e.g., in a broadcast message) and identify a connected VLC AP in the list. The UE may be configured to request an uplink connection to the base station with the request including an identity of the associated VLC AP. In such case, the base station associated the UE with the VLC AP based at least in part on the request. Additionally, or alternatively, the base station may configure separate physical random access channel (PRACH) resources for the request and to differentiate the request from other UEs for a non-relaying transmission.

In some aspects, the base station may transmit an indication of resources that support transmission, via an additional RF link, of additional uplink communications associated with additional downlink communications received via the additional RF link by the at least one of the UE or the additional UE. For example, the additional RF link may be associated with data communications between the UE and the base station and/or an associated core network. In some aspects, the additional RF link may provide access to the Internet via the associated core network.

The UE may configure itself based at least in part on the configuration information. In some aspects, the UE may be configured to perform one or more operations described herein based at least in part on the configuration information.

As shown by reference number 510, the UE may transmit, and the base station may receive, an indication of an identification of an AP associated with a VLC link. In some aspects, the UE may transmit the indication of the AP associated with the VLC link during a connection process with the base station. In some aspects, the UE may indicate the AP from a list of supported APs as indicated by the base station.

As shown by reference number 515, the UE may receive, and the base station may transmit, an indication of configured resources that support transmission of an uplink communication associated with a downlink communication received via the VLC link. For example, the UE may receive, from the base station and via an RF link associated with the base station, the indication of the configured resources (e.g., configured via RRC and/or MAC signaling in the RF link).

In some aspects, the configured resources may include semi-statically configured resources dedicated for transmitting uplink communications associated with the downlink communication. For example, the semi-statically configured resources may be configured to be unused by the RF link and/or additional RF links with additional UEs to avoid contention and/or collisions. In some aspects, the semi-statically configured resources may be shared with additional uplink communications associated with the RF link. For example, the resources may be allocated for selectable transmission of the uplink communication associated with the downlink communication or an additional uplink communication associated with the RF link. In this case, the UE may selectively transmit the uplink communication associated with the VLC link or the additional uplink communications associated with the RF link. For example, the UE may transmit the uplink communication associated with the VLC link or the additional uplink communications associated with the RF link based at least in part on priorities (e.g., indicated or configured) of the uplink communication associated with the VLC link and/or the additional uplink communications associated with the RF link. In some aspects, the semi-statically configured resources may be shared with additional uplink communications associated with the RF link and may support multiplexing such that the resources are allocated for transmission of the uplink communication associated with the downlink communication and the uplink communication associated with the RF link.

As shown by reference number 520, the UE my receive, and the VLC AP may transmit, the downlink communication via the VLC link. In some aspects, the downlink communication may include a multicast communication and/or a unicast communication. In some aspects, the downlink communication may be associated with L1 feedback to improve subsequent downlink communications.

As shown by reference number 525, the UE may transmit, and the base station may receive, a BSR that is associated with the uplink communication. In some aspects, the UE may transmit the BSR via an uplink data channel of the RF link, a scheduling request resource associated with the VLC link, and/or a RACH communication associated with the VLC link, among other examples. In some aspects, the UE may transmit, within or along with the BSR, an indication of (e.g., an identification of) the access point associated with the VLC link.

In some aspects, the UE may transmit the BSR based at least in part on the UE failing to receive, and/or the base station failing to transmit, the indication of configured resources as described in connection with reference number 515. In some aspects, the BSR indicates a request for resources for transmitting the uplink communication separately from an additional BSR for an additional uplink communication associated with the RF link. In some aspects, the BSR indicates an associated with the uplink communication (e.g., that the BSR is for a communication associated with a VLC uplink communication and/or that the BSR is for an uplink communication that is not associated with an RF communication).

As shown by reference number 530, the UE may monitor a downlink control channel (e.g., a PDCCH) for an indication of dynamically scheduled resources for transmitting the uplink communication. For example, the UE may monitor the downlink control channel based at least in part on transmitting the BSR associated with the uplink communication. In some aspects, the UE may monitor the downlink control channel for a downlink control channel communication scrambled based at least in part on a VLC C-RNTI associated with the UE.

As shown by reference number 535, the UE may receive, and the base station may transmit, the indication of the dynamically scheduled resources for transmitting the uplink communication. For example, the base station may transmit the indication of the dynamically scheduled resources based at least in part on the base station failing to transmit an indication of configured resources that support transmission of the uplink communication (e.g., as described in connection with reference number 515), based at least in part on receiving the BSR, and/or based at least in part on a request from the AP associated with the VLC.

As shown by reference number 540, the UE may determine priorities of the uplink communication and an additional uplink communication associated with the RF link. In some aspects, the priorities may be based at least in part on a type of communication (e.g., to prioritize control information and/or low latency data, among other examples). In some aspects, the priorities may be based at least in part on a type of scheduling communication used to schedule the uplink communication and the additional uplink communication (e.g., to prioritize dynamic scheduling communications and/or to prioritize most-recently transmitted scheduling communications, among other examples).

As shown by reference number 545, the UE may transmit, and the base station may receive, the uplink communication and/or the additional uplink communication associated with the RF link. For example, the UE may use the configured resources or the dynamically scheduled resources to transmit the uplink communication that is associated with the downlink communication received via the VLC link. In some aspects, the UE may multiplex the uplink communication with the additional uplink communication associated with the RF link. In some aspects, the UE may transmit, within or along with the uplink communication, an indication of an identification of the access point associated with the VLC link.

In some aspects, the UE may transmit the uplink communication based at least in part on a first priority associated with the uplink communication and a second priority associated with the additional uplink communication associated with the RF link that overlaps with the uplink communication (e.g., at least partially overlaps in time and/or frequencies).

In some aspects, the uplink communication may include an acknowledgement or negative acknowledgement (ACK/NACK) feedback for the downlink communication, uplink data for the VLC link, an indication of (e.g., an identification of) an access point associated with the VLC link, and/or an indication of a time parameter associated with the downlink communication, among other examples. In some aspects, the uplink communication may include an indication that the uplink communication is associated with the VLC link based at least in part on a logical channel identification (e.g., a MAC identification), a radio bearer identification, a VLC C-RNTI, a DMRS sequence, and/or a resource identification, among other examples. In some aspects, the indication of the timing parameters may assist the VLC AP to apply the uplink communication (e.g., HARQ-ACK) to an associated downlink communication. In some aspects, the VLC AP may use the indication of the timing parameters associated with the VLC link and not the RF link based at least in part on an asynchronized timing between the RF link and the VLC link.

Based at least in part on the base station supporting routing of VLC uplink communications to the VLC access point, the UE may conserve power resources that may otherwise be used to transmit VLC uplink communications via a VLC emitter. Additionally, or alternatively, based at least in part on the base station providing an indication of RF resources that support transmission of an uplink communication associated with a downlink communication received via a VLC link, the UE may transmit the uplink communication using numerology of an RF cell (e.g., an NR cell) provided by the base station and avoid communication errors that may have otherwise been caused by asynchronized numerology between the VLC link and the RF cell. Additionally, or alternatively, based at least in part on the UE indicating that the uplink communication is associated with the downlink communication received via the VLC link, the base station may route the uplink communication to the VLC AP without forwarding the uplink communication to an associated core network. In this way, the VLC AP may receive the uplink communication with reduced latency, the uplink communication may conserve resources of the core network, and/or the uplink communication may be used by the VLC AP to modify transmission parameters to reduce communication errors in subsequent VLC downlink communications.

As indicated above, FIG. 5 is provided as an example. Other examples may differ from what is described with regard to FIG. 5.

Figure 6:
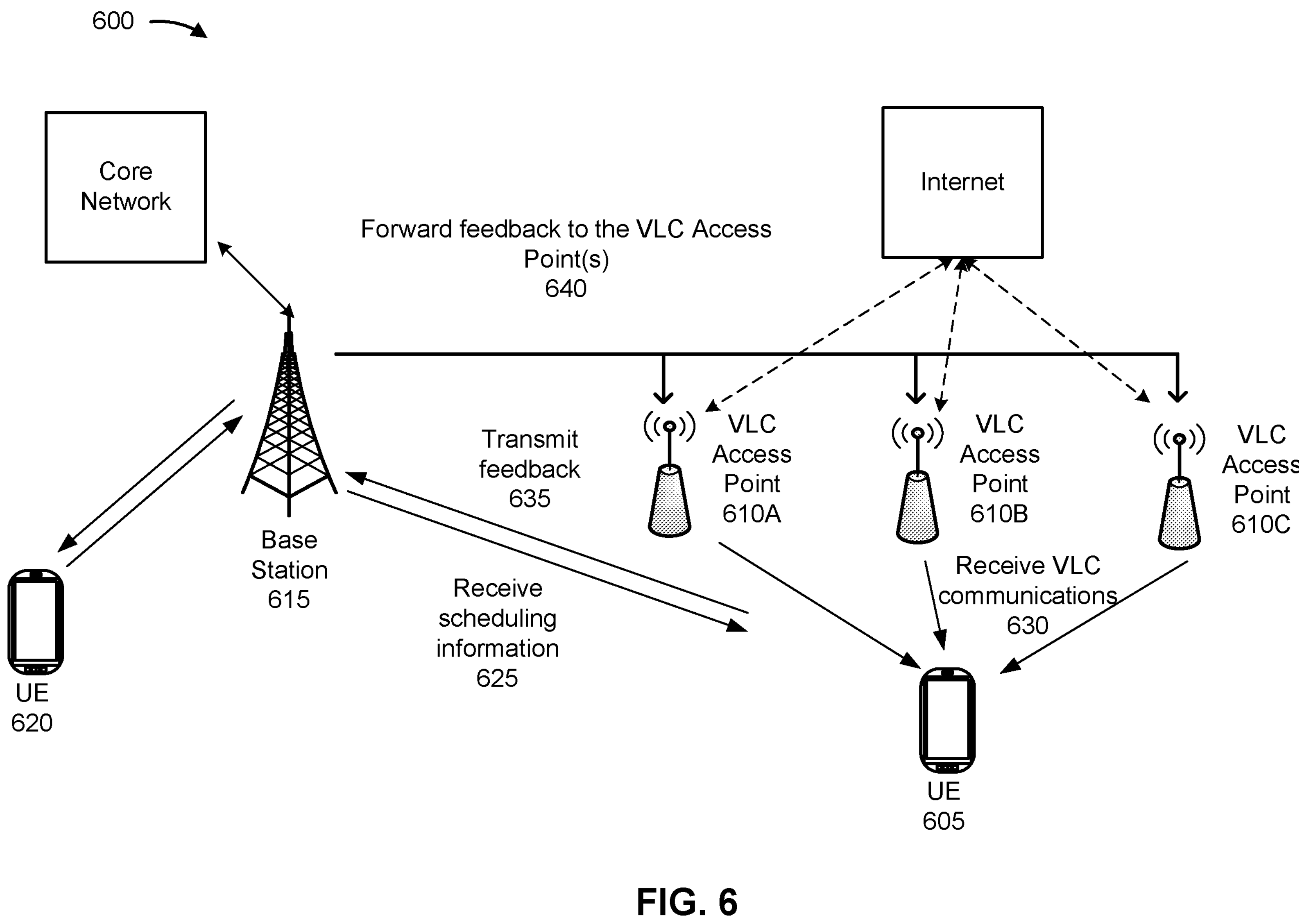

FIG. 6 is a diagram illustrating an example 600 associated with RF link transmission of uplink communications associated with VLC, in accordance with the present disclosure. As shown in FIG. 6, a UE 605 (e.g., UE 120) may communicate with a base station 615 (e.g., base station 110) and one or more VLC APs 610A-C. In some aspects, the base station 615 and the UE 605 may be part of an RF-based wireless network (e.g., an NR network such as wireless network 100). The UE 605 and the base station 615 may have established a wireless connection (e.g., an RF link) prior to operations shown in FIG. 6. In some aspects, the base station 615 may provide network access (e.g., to an associated core network and/or to the Internet) to at least one of the UE 605 or an additional UE 620.

As shown by reference number 625, the UE 605 may receive, and the base station 615 may transmit, scheduling information. For example, the scheduling information may include dynamically scheduled resources and/or configured resources. The scheduling information may indicate resources for the UE 605 to transmit an uplink communication associated with VLC downlink communications, resources to transmit an additional uplink communication associated with the RF link, resources that may be used to multiplex the downlink and the additional uplink communication and the uplink communication, and/or resources that may be used to transmit only one of the downlink and the additional uplink communication and the uplink communication, among other examples.

As shown by reference number 630, the UE 605 may receive one or more VLC communications from one or more of the VLC APs 610A-C. In some aspects, the UE 605 may receive the one or more VLC communications before receiving the scheduling information. For example, the UE 605 may receive the one or more VLC communications, transmit a BSR report to the base station 615, and then receive the scheduling information as described in connection with reference number 625.

As shown by reference number 635, the UE 605 may transmit feedback associated with the one or more VLC communications. For example, the UE 605 may transmit HARQ-ACK associated with the one or more VLC communications. In some aspects, the feedback may also include an indication of one or more of the VLC APs 610A-C associated with the one or more VLC communications. In some aspects, the indication may be explicit (e.g., identifying the one or more of the VLC APs 610A-V via an identification and/or an indication mapped to a list provided by the base station 615) or may be implicit (e.g., based at least in part on a DMRS configuration, a beam, and/or a resource among other examples, used to transmit the feedback).

As shown by reference number 640, the base station 615 may forward the feedback to the one or more VLC APs. For example, the base station 615 may forward the feedback using a backhaul connection and/or a backhaul network.

As indicated above, FIG. 6 is provided as an example. Other examples may differ from what is described with regard to FIG. 6.

FIGS. 7A and 7B are diagrams illustrating examples 700A and 700B associated with RF link transmission of uplink communications associated with VLC, in accordance with the present disclosure. As shown in FIGS. 7A and 7B, a UE (e.g., UE 120) may communicate with a base station (e.g., base station 110) and a VLC AP (e.g., via a VLC link). In some aspects, the base station and the UE may be part of an RF-based wireless network (e.g., an NR network such as wireless network 100). The UE and the base station may have established a wireless connection (e.g., an RF link) prior to operations shown in FIGS. 7A and 7B. In some aspects, the base station may provide network access (e.g., to an associated core network and/or to the Internet) to at least one of the UE or an additional UE.

As shown by reference number 705, the UE may receive, and the base station may transmit, semi-static configured PUCCH and/or configured grant (CG)-PUSCH for HARQ-ACK feedback associated with a VLC downlink communication.

As shown by reference number 710, the UE may receive, and the VLC-AP may transmit, downlink data via the VLC link. In some aspects, the downlink data may include a multicast communication, a unicast communication, or a broadcast communication, among other examples.

As shown by reference number 715, the UE may generate HARQ-ACK for the VLC downlink data. For example, the HARQ-ACK may indicate whether the UE received, demodulated, and decoded the downlink data received via the VLC link. In some aspects, the HARQ-ACK may include one additional bit with a value toggled (e.g., bit '0'→bit '1' or vice versa) to indicate whether a new HARQ-ACK feedback is transmitted for a given HARQ process. In some aspects, the UE may package the HARQ-ACK for all the HARQ processes associated with the VCL DL transmission in an uplink message for transmission via the RF link. In some aspects, the UE may identify an upcoming occasion for transmitting the HARQ-ACK via the semi-statically configured PUCCH and/or the CG-PUSCH resources.

As shown by reference number 720, the UE may transmit, and the base station may receive, the HARQ-ACK feedback using dedicated PUCCH resources and/or CG-PUSCH resources.

As shown by reference number 725, the base station may forward the HARQ-ACK feedback to the VLC AP. The VLC AP may use the HARQ-ACK feedback to configure one or more transmission parameters for subsequent downlink communications transmitted via VLC.

As shown by reference number 755, the UE may receive, and the VLC-AP may transmit, downlink data via the VLC link. In some aspects, the downlink data may include a multicast communication, a unicast communication, or a broadcast communication, among other examples.

As shown by reference number 760, the UE may generate VLC uplink data (e.g., for transmission to the VLC AP, VLC uplink data associated with the VLC downlink data, and/or HARQ-ACK feedback, among other examples). For example, the HARQ-ACK may indicate whether the UE received, demodulated, and decoded the downlink data received via the VLC link. In some aspects, the UE may package the HARQ-ACK in an uplink message for transmission via the RF link. In some aspects, the UE may identify an upcoming occasion for transmitting the HARQ-ACK via the semi-statically configured PUCCH and/or the CG-PUSCH resources.

As shown by reference number 765, the UE may transmit, and the base station may receive, a BSR to request resources for transmitting the VLC uplink data. In some aspects, the UE may transmit the BSR using scheduling request resources associated with requesting resources for the VLC uplink data. In some aspects, the UE may transmit the BSR with an indication that the scheduling request is associated with the VLC uplink data.

As shown by reference number 770, the UE may receive, and the base station may transmit, an uplink grant for the VLC uplink data with a CRC that is scrambled by a VLC C-RNTI associated with the VLC link.

As shown by reference number 775, the UE may transmit the VLC uplink data over the dynamically scheduled resources (e.g., within a PUSCH). For example, the UE transmits the VLC uplink data using resources of the RF link. The UE may transmit an indication of timing of the downlink data associated with the VLC uplink data for the VLC AP to map the downlink data to the VLC uplink data.

As shown by reference number 780, the base station may forward the VLC uplink data to the VLC AP. The VLC AP may use the VLC uplink data to configure one or more transmission parameters for subsequent downlink communications transmitted via VLC and/or to determine whether re-transmission is needed.

As indicated above, FIG. 7 is provided as an example. Other examples may differ from what is described with regard to FIG. 7.

Figure 8:
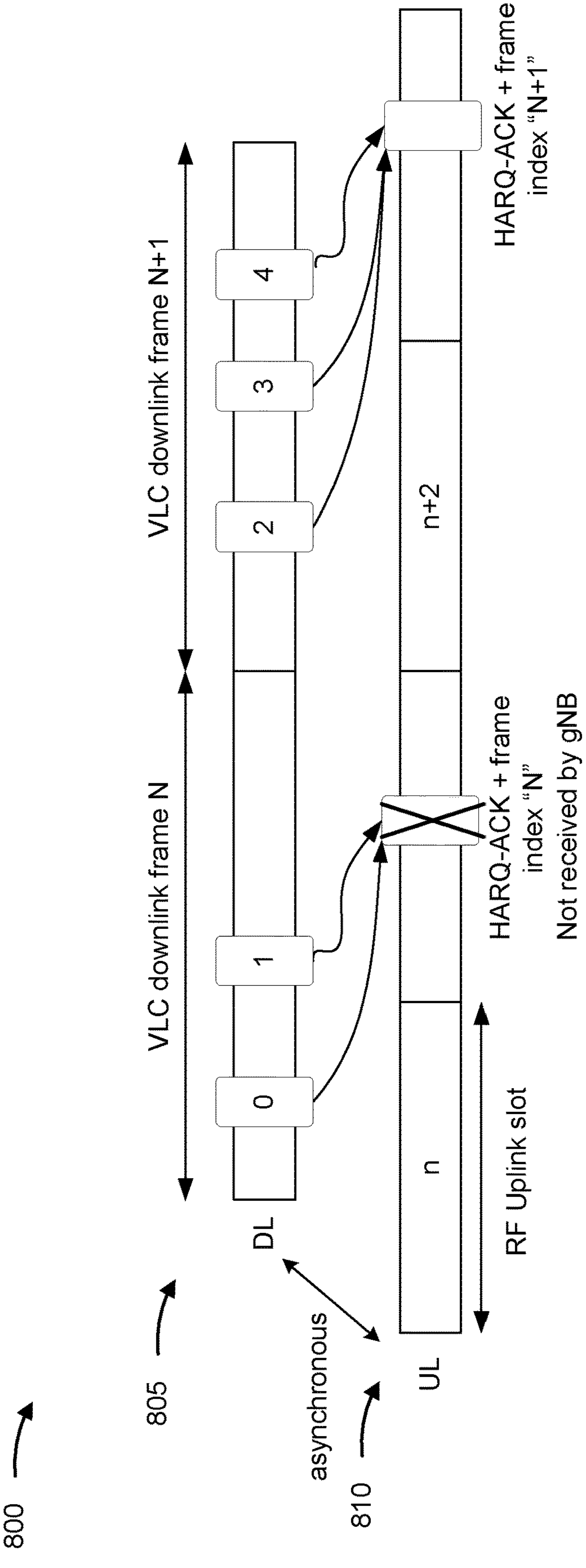

FIG. 8 is a diagram illustrating an example 800 associated with RF link transmission of uplink communications associated with VLC, in accordance with the present disclosure. As shown in FIG. 8, a UE (e.g., UE 120) may communicate with a base station (e.g., base station 110) and a VLC AP (e.g., via a VLC link). In some aspects, the base station and the UE may be part of an RF-based wireless network (e.g., an NR network such as wireless network 100). The UE and the base station may have established a wireless connection (e.g., an RF link) prior to operations shown in FIG. 8. In some aspects, the base station may provide network access (e.g., to an associated core network and/or to the Internet) to at least one of the UE or an additional UE.

As shown in FIG. 8, the UE may receive downlink communications from the VLC using a set of VLC frames 805. The set of VLC frames may include VLC downlink frame N and VLC downlink frame N+1. The UE may transmit uplink communications to the base station for forwarding to the VLC using a set of RF slots 810. The set of RF slots 810 may include slots n, n+1, n+2, and n+3.

As shown in FIG. 8, RF uplink slots, and associated occasions for transmitting VLC uplink information associated with downlink communications from the VLC, may not be time synchronized to the downlink communications from the VLC. Based at least in part on timing being asynchronous, the UE may transmit a timestamp of VLC downlink timing (e.g., a system frame number and/or a slot index) along with the associated uplink information.

Due to asynchronous timing between the VLC downlink communications and the RF uplink slots, the VLC downlink frames and the RF uplink slots may not have one-to-one mapping. Inclusion of the timestamp to the VLC uplink info (e.g., UCI reporting) enables the VLC AP to correctly map received VLC uplink information to downlink communications on the VLC link even if some of UCI messages are not received by gNB (e.g., shown at the RF uplink slot n+1).

As indicated above, FIG. 8 is provided as an example. Other examples may differ from what is described with regard to FIG. 8.

Figure 9:
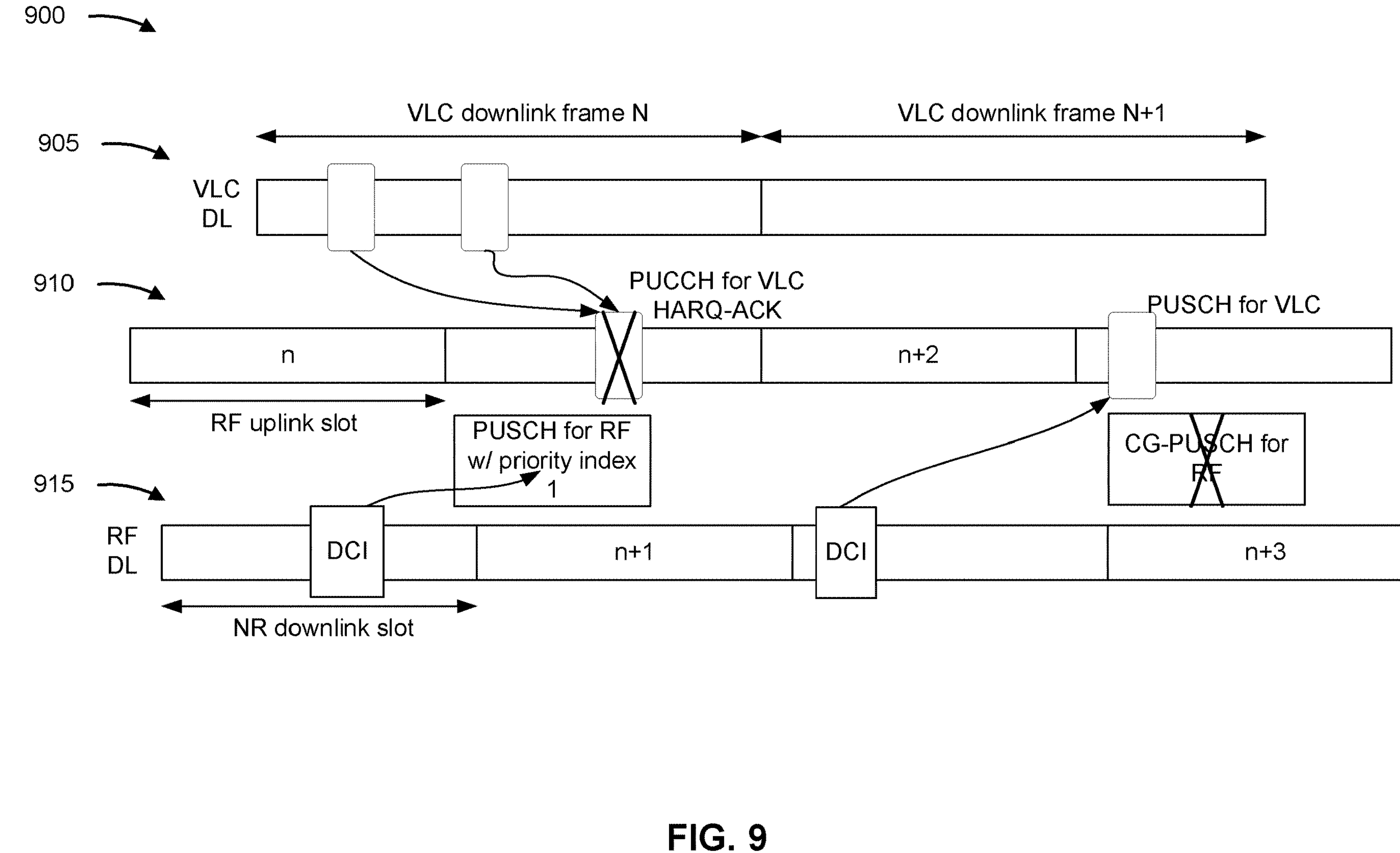

FIG. 9 is a diagram illustrating an example 900 associated with RF link transmission of uplink communications associated with VLC, in accordance with the present disclosure. As shown in FIG. 9, a UE (e.g., UE 120) may communicate with a base station (e.g., base station 110) and a VLC AP (e.g., via a VLC link). In some aspects, the base station and the UE may be part of an RF-based wireless network (e.g., an NR network such as wireless network 100). The UE and the base station may have established a wireless connection (e.g., an RF link) prior to operations shown in FIG. 8. In some aspects, the base station may provide network access (e.g., to an associated core network and/or to the Internet) to at least one of the UE or an additional UE.

As shown in FIG. 9, the UE may receive downlink communications from the VLC using a set of VLC frames 905. The set of VLC frames may include VLC downlink frame N and VLC downlink frame N+1. The UE may transmit uplink communications to the base station as part of the RF connection with the base station, or for forwarding to the VLC using a set of RF slots 910. The set of RF slots 910 may include slots n, n+1, n+2, and n+3. The UE may also receive downlink communications from the base station via RF slots 915.

As shown in FIG. 9, VLC uplink transmissions and RF uplink communications may fully or partially overlap in time (e.g., two PUSCHs or one PUSCH with a PUCCH). In this case, the UE may be configured to select one of a VLC uplink communication or an RF uplink communication, or the UE may multiplex both of the VLC uplink communication and the RF uplink communication, using resources that fully or partially overlap in time. For example, the UE may make a selection based at least in part on intra-UE transmission prioritization. Transmission priorities of the VLC uplink communication and the RF uplink communication may be based at least in part a configured priority indicator or a predefined rule, such as prioritization of dynamically scheduled transmissions prioritized over semi-statically configured transmission, among other examples.

As shown in slot n+1 of FIG. 9, the UE may transmit a PUSCH communication for the RF link and may not transmit a PUCCH communication for the VLC link (e.g., HARQ-ACK) based at least in part on a priority of the PUSCH communication for the RF being higher than a priority of the PUCCH communication for the VLC. As shown in slot n+3 of FIG. 9, the UE may transmit a PUSCH communication for the VLC and may not transmit a configured grant PUSCH communication for the RF based at least in part on a priority of the PUSCH communication for the VLC being higher than a priority of the configured grant PUSCH communication for the RF (e.g., based at least in part on prioritization of dynamically scheduled communications).

As indicated above, FIG. 9 is provided as an example. Other examples may differ from what is described with regard to FIG. 9.

Figure 10:
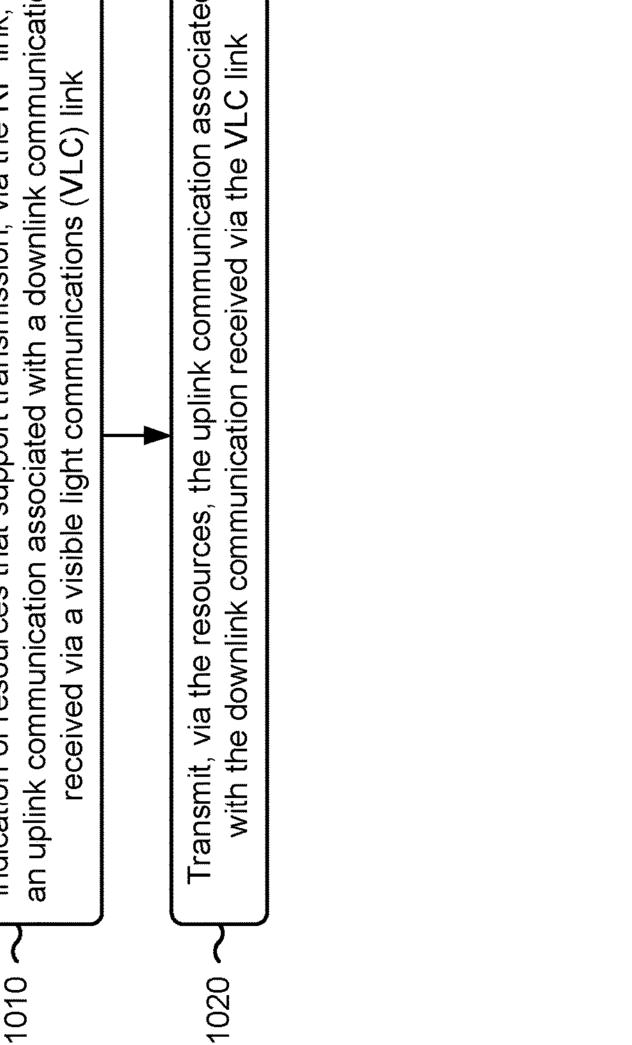
FIGS. 10 and 11 are diagrams illustrating example processes associated with radio frequency link transmission of uplink communications associated with visible light communications, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with RF link transmission of uplink communications associated with VLC.

As shown in FIG. 10, in some aspects, process 1000 may include receiving, from a base station and via an RF link, an indication of resources that support transmission, via the RF link, of an uplink communication associated with a downlink communication received via a VLC link (block 1010). For example, the UE (e.g., using communication manager 140 and/or reception component 1202, depicted in FIG. 12) may receive, from a base station and via an RF link, an indication of resources that support transmission, via the RF link, of an uplink communication associated with a downlink communication received via a VLC link, as described above.

As further shown in FIG. 10, in some aspects, process 1000 may include transmitting, via the resources, the uplink communication associated with the downlink communication received via the VLC link (block 1020). For example, the UE (e.g., using communication manager 140 and/or transmission component 1204, depicted in FIG. 12) may transmit, via the resources, the uplink communication associated with the downlink communication received via the VLC link, as described above.

Process 1000 may include additional aspects, such as any single aspect or any combination of aspects described below and/or in connection with one or more other processes described elsewhere herein.

In a first aspect, process 1000 includes receiving, before transmitting the uplink communication, the downlink communication via the VLC link.

In a second aspect, alone or in combination with the first aspect, the resources comprise one or more of semi-statically configured resources dedicated for transmitting uplink communications associated with the downlink communication, semi-statically configured resources shared with additional uplink communications associated with the RF link, dynamically scheduling resources for transmitting the uplink communication associated with the downlink communication, resources allocated for selectable transmission of the uplink communication associated with the downlink communication or an additional uplink communication associated with the RF link, resources allocated for transmission of the uplink communication associated with the downlink communication and the uplink communication associated with the RF link, or resources dedicated for transmission of the uplink communication.

In a third aspect, alone or in combination with one or more of the first and second aspects, the uplink communication comprises one or more of ACK/NACK feedback for the VLC downlink communication, an indication of (e.g., an identification of) an access point associated with the VLC link, or an indication of a time parameter associated with the downlink communication.

In a fourth aspect, alone or in combination with one or more of the first through third aspects, the uplink communication includes an indication that the uplink communication is associated with the VLC link based at least in part on one or more of a logical channel identification, a radio bearer identification, a VLC cell radio network temporary identifier, a demodulation reference signal sequence, or a resource identification.

In a fifth aspect, alone or in combination with one or more of the first through fourth aspects, transmitting the uplink communication comprises multiplexing the uplink communication with an additional uplink communication associated with the RF link.

In a sixth aspect, alone or in combination with one or more of the first through fifth aspects, process 1000 includes transmitting a BSR that is associated with the uplink communication, wherein the BSR indicates a request for resources for transmitting the uplink communication separately from an additional BSR for transmitting an additional uplink communication associated with the RF link.

In a seventh aspect, alone or in combination with one or more of the first through sixth aspects, transmitting the BSR comprises transmitting the BSR via one or more of an uplink data channel of the RF link, a scheduling request resource associated with the VLC link, or a random access channel communication associated with the VLC link.

In an eighth aspect, alone or in combination with one or more of the first through seventh aspects, process 1000 includes monitoring a downlink control channel for the indication of resources based at least in part on transmitting the BSR associated with the uplink communication.

In a ninth aspect, alone or in combination with one or more of the first through eighth aspects, monitoring the downlink control channel for the indication of resources comprises monitoring the downlink control channel for a downlink control channel communication scrambled based at least in part on a VLC cell radio network temporary identifier associated with the UE.

In a tenth aspect, alone or in combination with one or more of the first through ninth aspects, transmitting the uplink communication comprises transmitting the uplink communication based at least in part on a first priority associated with the uplink communication and a second priority associated with an additional uplink communication associated with the RF link that overlaps with the uplink communication.

In an eleventh aspect, alone or in combination with one or more of the first through tenth aspects, process 1000 includes receiving, from a base station associated with the RF link, an indication that a base station associated with the RF link supports reception of the uplink communication for routing to an access point associated with the VLC link.

In a twelfth aspect, alone or in combination with one or more of the first through eleventh aspects, process 1000 includes one or more of receiving an indication of access channel resources to register the UE via the RF link, or receiving an indication of a VLC cell radio network temporary identifier associated with communication of the uplink communication.

In a thirteenth aspect, alone or in combination with one or more of the first through twelfth aspects, process 1000 includes transmitting an indication of (e.g., an identification of) an access point associated with the VLC link.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
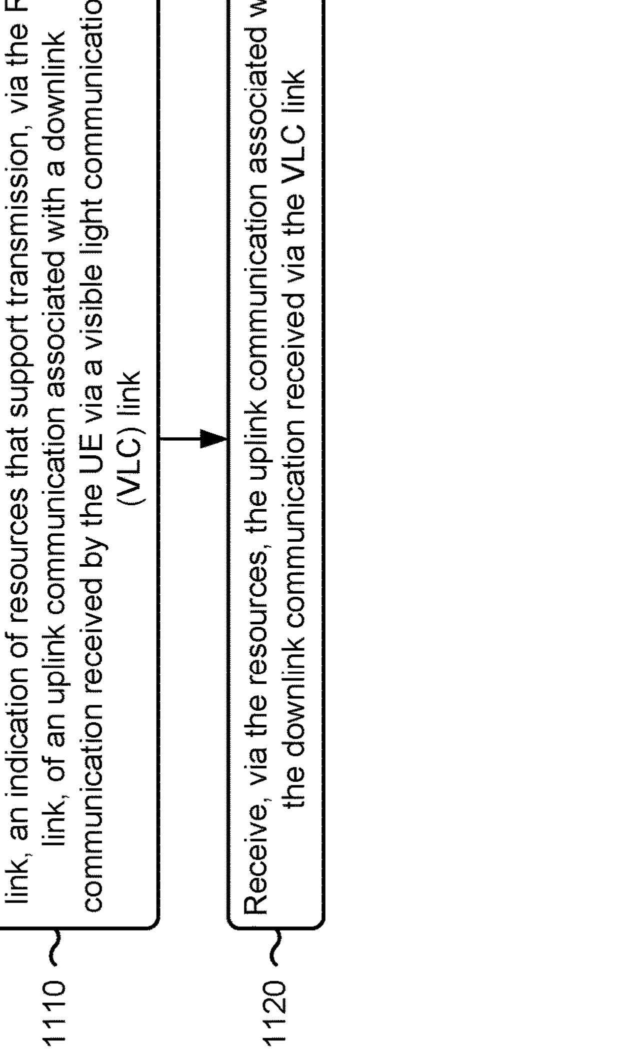

FIG. 11 is a diagram illustrating an example process 1100 performed, for example, by a base station, in accordance with the present disclosure. Example process 1100 is an example where the base station (e.g., base station 110) performs operations associated with RF link transmission of uplink communications associated with VLC.

As shown in FIG. 11, in some aspects, process 1100 may include transmitting, to a UE and via an RF link, an indication of resources that support transmission, via the RF link, of an uplink communication associated with a downlink communication received by the UE via a VLC link (block 1110). For example, the base station (e.g., using communication manager 150 and/or transmission component 1304, depicted in FIG. 13) may transmit, to a UE and via an RF link, an indication of resources that support transmission, via the RF link, of an uplink communication associated with a downlink communication received by the UE via a VLC link, as described above.

As further shown in FIG. 11, in some aspects, process 1100 may include receiving, via the resources, the uplink communication associated with the downlink communication received via the VLC link (block 1120). For example, the base station (e.g., using communication manager 150 and/or reception component 1302, depicted in FIG. 13) may receive, via the resources, the uplink communication associated with the downlink communication received via the VLC link, as described above.

Process 1100 may include additional aspects, such as any single aspect or any combination of aspects described below and/or in connection with one or more other processes described elsewhere herein.

In a first aspect, the resources comprise one or more of semi-statically configured resources dedicated for transmitting uplink communications associated with the downlink communication, semi-statically configured resources shared with additional uplink communications associated with the RF link, dynamically scheduling resources for transmitting the uplink communication associated with the downlink communication, resources allocated for selectable transmission of the uplink communication associated with the downlink communication or an additional uplink communication associated with the RF link, resources allocated for transmission of the uplink communication associated with the downlink communication and the uplink communication associated with the RF link, or resources dedicated for transmission of the uplink communication.

In a second aspect, alone or in combination with the first aspect, the uplink communication comprises one or more of ACK/NACK feedback for the downlink communication, an indication of (e.g., an identification of) an access point associated with the VLC link, or an indication of a time parameter associated with the downlink communication.

In a third aspect, alone or in combination with one or more of the first and second aspects, the uplink communication includes an indication that the uplink communication is associated with the VLC link based at least in part on one or more of a logical channel identification, a radio bearer identification, a VLC cell radio network temporary identifier, a demodulation reference signal sequence, or a resource identification.

In a fourth aspect, alone or in combination with one or more of the first through third aspects, receiving the uplink communication comprises receiving the uplink communication multiplexed with an additional uplink communication associated with the RF link.

In a fifth aspect, alone or in combination with one or more of the first through fourth aspects, process 1100 includes receiving a BSR that is associated with the uplink communication, wherein the BSR indicates a request for resources for transmitting the uplink communication separately from an additional BSR for transmitting an additional uplink communication associated with the RF link.

In a sixth aspect, alone or in combination with one or more of the first through fifth aspects, receiving the BSR comprises receiving the BSR via one or more of an uplink data channel of the RF link, a scheduling request resource associated with the VLC link, or a random access channel communication associated with the VLC link.

In a seventh aspect, alone or in combination with one or more of the first through sixth aspects, transmitting the indication of resources comprises transmitting the indication of resources based at least in part on receiving the BSR associated with the uplink communication.

In an eighth aspect, alone or in combination with one or more of the first through seventh aspects, transmitting the indication of resources comprises transmitting the indication of resources scrambled based at least in part on a VLC cell radio network temporary identifier associated with the UE.

In a ninth aspect, alone or in combination with one or more of the first through eighth aspects, receiving the uplink communication comprises receiving the uplink communication based at least in part on a first priority associated with the uplink communication and a second priority associated with an additional uplink communication associated with the RF link that overlaps with the uplink communication.

In a tenth aspect, alone or in combination with one or more of the first through ninth aspects, process 1100 includes receiving, from a base station associated with the RF link, an indication that a base station associated with the RF link supports reception of the uplink communication for routing to an access point associated with the VLC link.

In an eleventh aspect, alone or in combination with one or more of the first through tenth aspects, process 1100 includes one or more of transmitting an indication of access channel resources to register the UE via the RF link, or transmitting an indication of a VLC cell radio network temporary identifier associated with communication of the uplink communication.

In a twelfth aspect, alone or in combination with one or more of the first through eleventh aspects, process 1100 includes receiving an indication of (e.g., an identification of) an access point associated with the VLC link.

In a thirteenth aspect, alone or in combination with one or more of the first through twelfth aspects, the resources comprise one or more of resources allocated for selectable transmission of the uplink communication or an uplink communication associated with the RF link, or resources dedicated for transmission of the uplink communication.

In a fourteenth aspect, alone or in combination with one or more of the first through thirteenth aspects, process 1100 includes routing the uplink communication to an access point associated with the VLC link.

In a fifteenth aspect, alone or in combination with one or more of the first through fourteenth aspects, process 1100 includes providing network access to at least one of the UE or an additional UE, and transmitting an indication of resources that support transmission, via an additional RF link, of additional uplink communications associated with additional downlink communications received via the additional RF link by the at least one of the UE or the additional UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
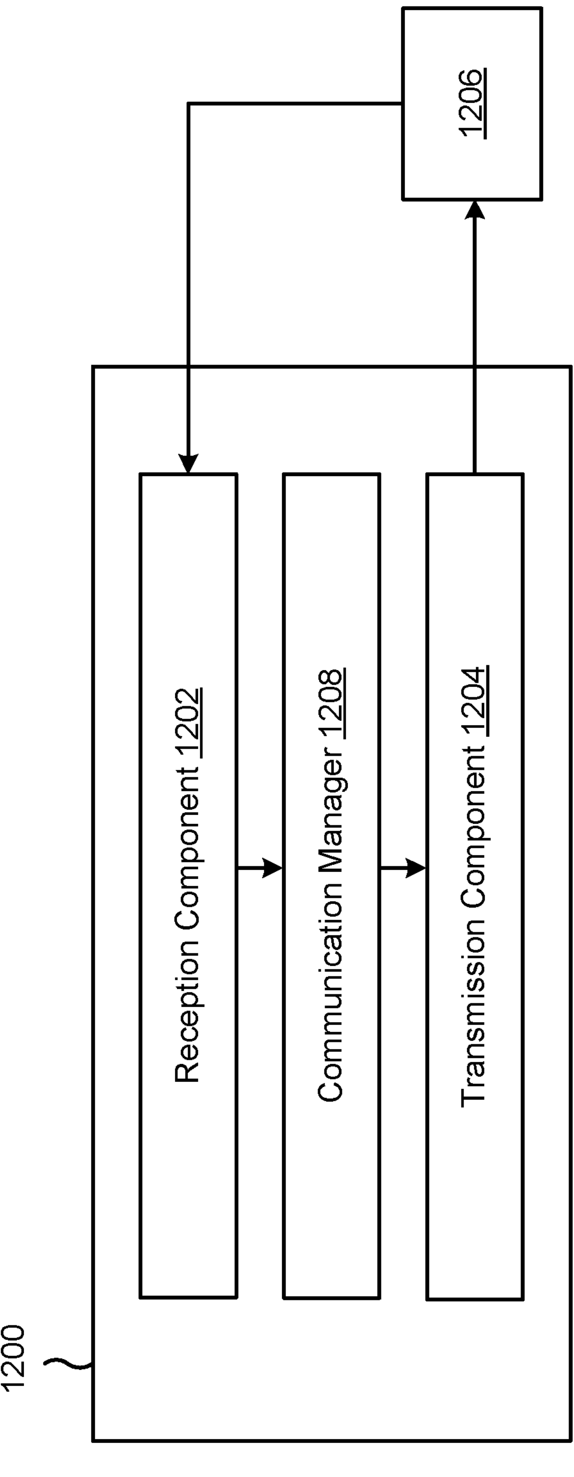
FIGS. 12 and 13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208 (e.g., the communication manager 140).

In some aspects, the apparatus 1200 may be configured to perform one or more operations described herein in connection with FIGS. 5-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a base station and via an RF link, an indication of resources that support transmission, via the RF link, of an uplink communication associated with a downlink communication received via a VLC link. The transmission component 1204 may transmit, via the resources, the uplink communication associated with the downlink communication received via the VLC link.

The reception component 1202 may receive, before transmitting the uplink communication, the downlink communication via the VLC link.

The transmission component 1204 may transmit a BSR that is associated with the uplink communication wherein the BSR indicates a request for resources for transmitting the uplink communication separately from an additional BSR for transmitting an additional uplink communication associated with the RF link.

The communication manager 1208 and/or the reception component 1202 may monitor a downlink control channel for the indication of resources based at least in part on transmitting the BSR associated with the uplink communication.

The reception component 1202 may receive, from a base station associated with the RF link, an indication that a base station associated with the RF link supports reception of the uplink communication for routing to an access point associated with the VLC link.

The transmission component 1204 may transmit an indication of (e.g., an identification of) an access point associated with the VLC link.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
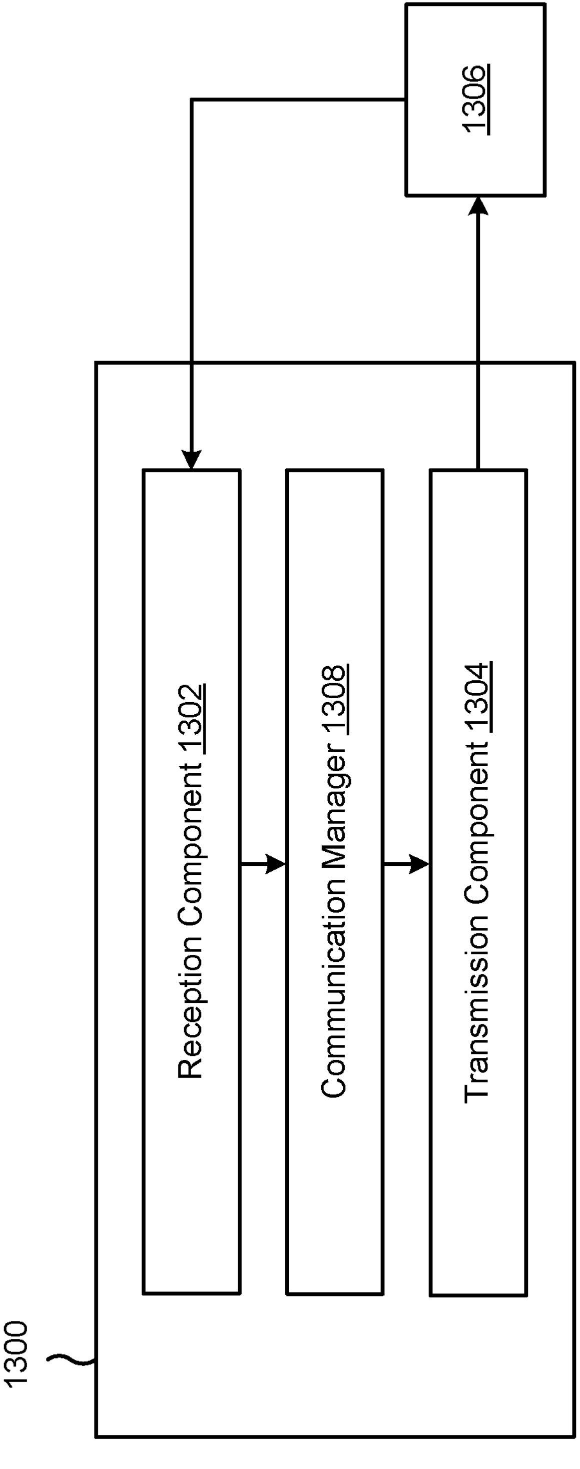

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a communication manager 1308 (e.g., the communication manager 150).

In some aspects, the apparatus 1300 may be configured to perform one or more operations described herein in connection with FIGS. 5-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The transmission component 1304 may transmit, to a UE and via an RF link, an indication of resources that support transmission, via the RF link, of an uplink communication associated with a downlink communication received by the UE via a VLC link. The reception component 1302 may receive, via the resources, the uplink communication associated with the downlink communication received via the VLC link.

The reception component 1302 may receive a BSR that is associated with the uplink communication, wherein the BSR indicates a request for resources for transmitting the uplink communication separately from an additional BSR for transmitting an additional uplink communication associated with the RF link.

The reception component 1302 may receive, from a base station associated with the RF link, an indication that a base station associated with the RF link supports reception of the uplink communication for routing to an access point associated with the VLC link.

The transmission component 1304 may transmit an indication of (e.g., an identification of) an access point associated with the VLC link.

The communication manager 1308 and/or the transmission component 1304 may route the uplink communication to an access point associated with the VLC link.

The communication manager 1308 may provide network access to at least one of the UE or an additional UE.

The transmission component 1304 may transmit an indication of resources that support transmission, via an additional RF link, of additional uplink communications associated with additional downlink communications received via the additional RF link by the at least one of the UE or the additional UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a base station and via a radio frequency (RF) link, an indication of resources that support transmission, via the RF link, of an uplink communication associated with a downlink communication received via a visible light communications (VLC) link; and transmitting, via the resources, the uplink communication associated with the downlink communication received via the VLC link.

Aspect 2: The method of Aspect 1, further comprising: receiving, before transmitting the uplink communication, the downlink communication via the VLC link.

Aspect 3: The method of any of Aspects 1-2, wherein the resources comprise one or more of: semi-statically configured resources dedicated for transmitting uplink communications associated with the downlink communication, semi-statically configured resources shared with additional uplink communications associated with the RF link, dynamically scheduled resources for transmitting the uplink communication associated with the downlink communication, resources allocated for selectable transmission of the uplink communication associated with the downlink communication or an additional uplink communication associated with the RF link, resources allocated for transmission of the uplink communication associated with the downlink communication and the uplink communication associated with the RF link, or resources dedicated for transmission of the uplink communication.

Aspect 4: The method of any of Aspects 1-3, wherein the uplink communication comprises one or more of: acknowledgement or negative acknowledgement (ACK/NACK) feedback for the downlink communication, an indication of an access point associated with the VLC link, or an indication of a time parameter associated with the downlink communication.

Aspect 5: The method of any of Aspects 1-4, wherein the uplink communication includes an indication that the uplink communication is associated with the VLC link based at least in part on one or more of: a logical channel identification, a radio bearer identification, a VLC cell radio network temporary identifier, a demodulation reference signal sequence, or a resource identification.

Aspect 6: The method of any of Aspects 1-5, wherein transmitting the uplink communication comprises: multiplexing the uplink communication with an additional uplink communication associated with the RF link.

Aspect 7: The method of any of Aspects 1-6, further comprising: transmitting a buffer status report (BSR) associated with the uplink communication, wherein the BSR indicates a request for resources for transmitting the uplink communication separately from an additional BSR for transmitting an additional uplink communication associated with the RF link.

Aspect 8: The method of Aspect 7, wherein transmitting the BSR comprises transmitting the BSR via one or more of: an uplink data channel of the RF link, a scheduling request resource associated with the VLC link, or a random access channel communication associated with the VLC link.

Aspect 9: The method of any of Aspects 7-8, further comprising: monitoring a downlink control channel for the indication of resources based at least in part on transmitting the BSR associated with the uplink communication.

Aspect 10: The method of Aspect 9, wherein monitoring the downlink control channel for the indication of resources comprises: monitoring the downlink control channel for a downlink control channel communication scrambled based at least in part on a VLC cell radio network temporary identifier associated with the UE.

Aspect 11: The method of any of Aspects 1-10, wherein transmitting the uplink communication comprises: transmitting the uplink communication based at least in part on a first priority associated with the uplink communication and a second priority associated with an additional uplink communication associated with the RF link that overlaps with the uplink communication.

Aspect 12: The method of any of Aspects 1-11, further comprising: receiving, from a base station associated with the RF link, an indication that a base station associated with the RF link supports reception of the uplink communication for routing to an access point associated with the VLC link.

Aspect 13: The method of any of Aspects 1-12, further comprising one or more of: receiving an indication of access channel resources to register the UE via the RF link, or receiving an indication of a VLC cell radio network temporary identifier associated with communication of the uplink communication.

Aspect 14: The method of Aspect 13, further comprising: transmitting an indication of an access point associated with the VLC link.

Aspect 15: A method of wireless communication performed by a base station, comprising: transmitting, to a user equipment (UE) and via a radio frequency (RF) link, an indication of resources that support transmission, via the RF link, of an uplink communication associated with a downlink communication received by the UE via a visible light communications (VLC) link; and receiving, via the resources, the uplink communication associated with the downlink communication received via the VLC link.

Aspect 16: The method of Aspect 15, wherein the resources comprise one or more of: semi-statically configured resources dedicated for transmitting uplink communications associated with the downlink communication, semi-statically configured resources shared with additional uplink communications associated with the RF link, dynamically scheduled resources for transmitting the uplink communication associated with the downlink communication, resources allocated for selectable transmission of the uplink communication associated with the downlink communication or an additional uplink communication associated with the RF link, resources allocated for transmission of the uplink communication associated with the downlink communication and the uplink communication associated with the RF link, or resources dedicated for transmission of the uplink communication.

Aspect 17: The method of any of Aspects 15-16, wherein the uplink communication comprises one or more of: acknowledgement or negative acknowledgement (ACK/NACK) feedback for the downlink communication, an indication of an access point associated with the VLC link, or an indication of a time parameter associated with the downlink communication.

Aspect 18: The method of any of Aspects 15-17, wherein the uplink communication includes an indication that the uplink communication is associated with the VLC link based at least in part on one or more of: a logical channel identification, a radio bearer identification, a VLC cell radio network temporary identifier, a demodulation reference signal sequence, or a resource identification.

Aspect 19: The method of any of Aspects 15-18, wherein receiving the uplink communication comprises: receiving the uplink communication multiplexed with an additional uplink communication associated with the RF link.

Aspect 20: The method of any of Aspects 15-19, further comprising: receiving a buffer status report (BSR) associated with the uplink communication, wherein the BSR indicates a request for resources for transmitting the uplink communication separately from an additional BSR for transmitting an additional uplink communication associated with the RF link.

Aspect 21: The method of Aspect 20, wherein receiving the BSR comprises receiving the BSR via one or more of: an uplink data channel of the RF link, a scheduling request resource associated with the VLC link, or a random access channel communication associated with the VLC link.

Aspect 22: The method of Aspect 21, wherein transmitting the indication of resources comprises: transmitting the indication of resources based at least in part on receiving the BSR associated with the uplink communication.

Aspect 23: The method of Aspect 22, wherein transmitting the indication of resources comprises: transmitting the indication of resources scrambled based at least in part on a VLC cell radio network temporary identifier associated with the UE.

Aspect 24: The method of any of Aspects 15-23, wherein receiving the uplink communication comprises: receiving the uplink communication based at least in part on a first priority associated with the uplink communication and a second priority associated with an additional uplink communication associated with the RF link that overlaps with the uplink communication.

Aspect 25: The method of any of Aspects 15-24, further comprising: receiving, from a base station associated with the RF link, an indication that a base station associated with the RF link supports reception of the uplink communication for routing to an access point associated with the VLC link.

Aspect 26: The method of any of Aspects 15-25, further comprising one or more of: transmitting an indication of access channel resources to register the UE via the RF link, or transmitting an indication of a VLC cell radio network temporary identifier associated with communication of the uplink communication.

Aspect 27: The method of Aspect 26, further comprising: transmitting an indication of an access point associated with the VLC link.

Aspect 28: The method of any of Aspects 15-27, wherein the resources comprise one or more of: resources allocated for selectable transmission of the uplink communication or an uplink communication associated with the RF link, or resources dedicated for transmission of the uplink communication.

Aspect 29: The method of any of Aspects 15-28, further comprising: routing the uplink communication to an access point associated with the VLC link.

Aspect 30: The method of any of Aspects 15-29, further comprising: providing network access to at least one of the UE or an additional UE; and transmitting an indication of resources that support transmission, via an additional RF link, of additional uplink communications associated with additional downlink communications received via the additional RF link by the at least one of the UE or the additional UE.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

transmit, to a base station, a buffer status report (BSR) indicating a request for resources to transmit an uplink communication, wherein the BSR indicates the request for the resources separately from an additional BSR associated with a transmission of an additional uplink communication associated with a radio frequency (RF) link;

receive, from the base station and via the RF link, an indication of the resources, wherein the resources support transmission, via the RF link, of the uplink communication, wherein the uplink communication is associated with a downlink communication received via a visible light communications (VLC) link; and transmit, via the resources, the uplink communication.

2. The UE of claim 1, wherein the one or more processors are further configured to:

receive, before transmitting the uplink communication, the downlink communication via the VLC link.

3. The UE of claim 1, wherein the resources comprise one or more of:

semi-statically configured resources dedicated for transmitting uplink communications associated with the downlink communication, semi-statically configured resources shared with additional uplink communications associated with the RF link, dynamically scheduled resources for transmitting the uplink communication, resources allocated for selectable transmission of the uplink communication or the additional uplink communication, resources allocated for transmission of the uplink communication and the additional uplink communication, or resources dedicated for transmission of the uplink communication.

4. The UE of claim 1, wherein the uplink communication comprises one or more of:

acknowledgement or negative acknowledgement (ACK/NACK) feedback for the downlink communication, an indication of an access point associated with the VLC link, or an indication of a time parameter associated with the downlink communication.

5. The UE of claim 1, wherein the uplink communication includes an indication that the uplink communication is associated with the VLC link based at least in part on one or more of:

a logical channel identification, a radio bearer identification, a VLC cell radio network temporary identifier, a demodulation reference signal sequence, or a resource identification.

6. The UE of claim 1, wherein the one or more processors, to transmit the uplink communication, are configured to:

multiplex the uplink communication with the additional uplink communication.

7. The UE of claim 1, wherein the RF link and the VLC link are provided by non-co-located nodes, wherein the base station comprises one of the non-co-located nodes.

8. The UE of claim 1, wherein the one or more processors, to transmit the BSR, are configured to transmit the BSR via one or more of:

an uplink data channel of the RF link, a scheduling request resource associated with the VLC link, or a random access channel communication associated with the VLC link.

9. The UE of claim 7, wherein the one or more processors are further configured to:

monitor a downlink control channel for the indication of the resources based at least in part on transmitting the BSR.

10. The UE of claim 9, wherein the one or more processors, to monitor the downlink control channel for the indication of the resources, are configured to:

monitor the downlink control channel for a downlink control channel communication scrambled based at least in part on a VLC cell radio network temporary identifier associated with the UE.

11. The UE of claim 1, wherein the one or more processors, to transmit the uplink communication, are configured to:

transmit the uplink communication based at least in part on a first priority associated with the uplink communication and a second priority associated with the additional uplink communication, wherein the additional uplink communication overlaps with the uplink communication.

12. The UE of claim 1, wherein the one or more processors are further configured to:

receive, from the base station, an indication that the base station supports reception of the uplink communication for routing to an access point associated with the VLC link.

13. The UE of claim 1, wherein the one or more processors are further configured to one or more of:

receive an indication of access channel resources to register the UE via the RF link, or receive an indication of a VLC cell radio network temporary identifier associated with communication of the uplink communication.

14. The UE of claim 13, wherein the one or more processors are further configured to:

transmit an indication of an access point associated with the VLC link.

15. A base station for wireless communication, comprising:

a memory; and one or more processors, coupled to the memory, configured to:

receive, from a user equipment (UE), a buffer status report (BSR) indicating a request for resources to transmit an uplink communication, wherein the BSR indicates the request for the resources separately from an additional BSR associated with a transmission of an additional uplink communication associated with a radio frequency (RF) link;

transmit, to the UE and via the RF link, an indication of the resources, wherein the resources support transmission, via the RF link, of the uplink communication, wherein the uplink communication is associated with a downlink communication received by the UE via a visible light communications (VLC) link; and receive, via the resources, the uplink communication.

16. The base station of claim 15, wherein the resources comprise one or more of:

semi-statically configured resources dedicated for transmitting uplink communications associated with the downlink communication, semi-statically configured resources shared with additional uplink communications associated with the RF link, dynamically scheduled resources for transmitting the uplink communication, resources allocated for selectable transmission of the uplink communication or the additional uplink communication, resources allocated for transmission of the uplink communication and the additional uplink communication, or resources dedicated for transmission of the uplink communication.

17. The base station of claim 15, wherein the uplink communication comprises one or more of:

acknowledgement or negative acknowledgement (ACK/NACK) feedback for the downlink communication, an indication of an access point associated with the VLC link, or an indication of a time parameter associated with the downlink communication.

18. The base station of claim 15, wherein the uplink communication includes an indication that the uplink communication is associated with the VLC link based at least in part on one or more of:

a logical channel identification, a radio bearer identification, a VLC cell radio network temporary identifier, a demodulation reference signal sequence, or a resource identification.

19. The base station of claim 15, wherein the one or more processors, to receive the uplink communication, are configured to:

receive the uplink communication multiplexed with the additional uplink communication.

20. The base station of claim 15, wherein the RF link and the VLC link are provided by non-co-located nodes, wherein the base station comprises one of the non-co-located nodes.

21. The base station of claim 15, wherein the one or more processors, to receive the BSR, are configured to receive the BSR via one or more of:

an uplink data channel of the RF link, a scheduling request resource associated with the VLC link, or a random access channel communication associated with the VLC link.

22. The base station of claim 21, wherein the one or more processors, to transmit the indication of the resources, are configured to:

transmit the indication of the resources based at least in part on receiving the BSR.

23. The base station of claim 22, wherein the one or more processors, to transmit the indication of the resources, are configured to:

transmit the indication of the resources scrambled based at least in part on a VLC cell radio network temporary identifier associated with the UE.

24. The base station of claim 15, wherein the one or more processors, to receive the uplink communication, are configured to:

receive the uplink communication based at least in part on a first priority associated with the uplink communication and a second priority associated with the additional uplink communication, wherein the additional uplink communication overlaps with the uplink communication.

25. The base station of claim 15, wherein the one or more processors are further configured to:

receive, from another base station associated with the RF link, an indication that the other base station supports reception of the uplink communication for routing to an access point associated with the VLC link.

26. The base station of claim 15, wherein the one or more processors are further configured to one or more of:

transmit an indication of access channel resources to register the UE via the RF link, or transmit an indication of a VLC cell radio network temporary identifier associated with communication of the uplink communication.

27. The base station of claim 15, wherein the one or more processors are further configured to:

route the uplink communication to an access point associated with the VLC link.

28. The UE of claim 1, wherein the RF link is provided by an outdoor base station and the VLC link is provided by an indoor VLC access point (AP), and wherein the base station comprises the outdoor base station.

29. A method of wireless communication performed by a user equipment (UE), comprising:

transmitting, to a base station, a buffer status report (BSR) indicating a request for resources to transmit an uplink communication, wherein the BSR indicates the request for the resources separately from an additional BSR associated with a transmission of an additional uplink communication associated with a radio frequency (RF) link;

receiving, from the base station and via the RF link, an indication of the resources, wherein the resources support transmission, via the RF link, of the uplink communication, wherein the uplink communication is associated with a downlink communication received via a visible light communications (VLC) link; and transmitting, via the resources, the uplink communication.

30. A method of wireless communication performed by a base station, comprising:

receiving, from a user equipment (UE), a buffer status report (BSR) indicating a request for resources to transmit an uplink communication, wherein the BSR indicates the request for the resources separately from an additional BSR associated with a transmission of an additional uplink communication associated with a radio frequency (RF) link;

transmitting, to the UE and via the RF link, an indication of the resources, wherein the resources support transmission, via the RF link, of the uplink communication, wherein the uplink communication is associated with a downlink communication received by the UE via a visible light communications (VLC) link; and receiving, via the resources, the uplink communication.

* * * * *